Patented July 7, 1931

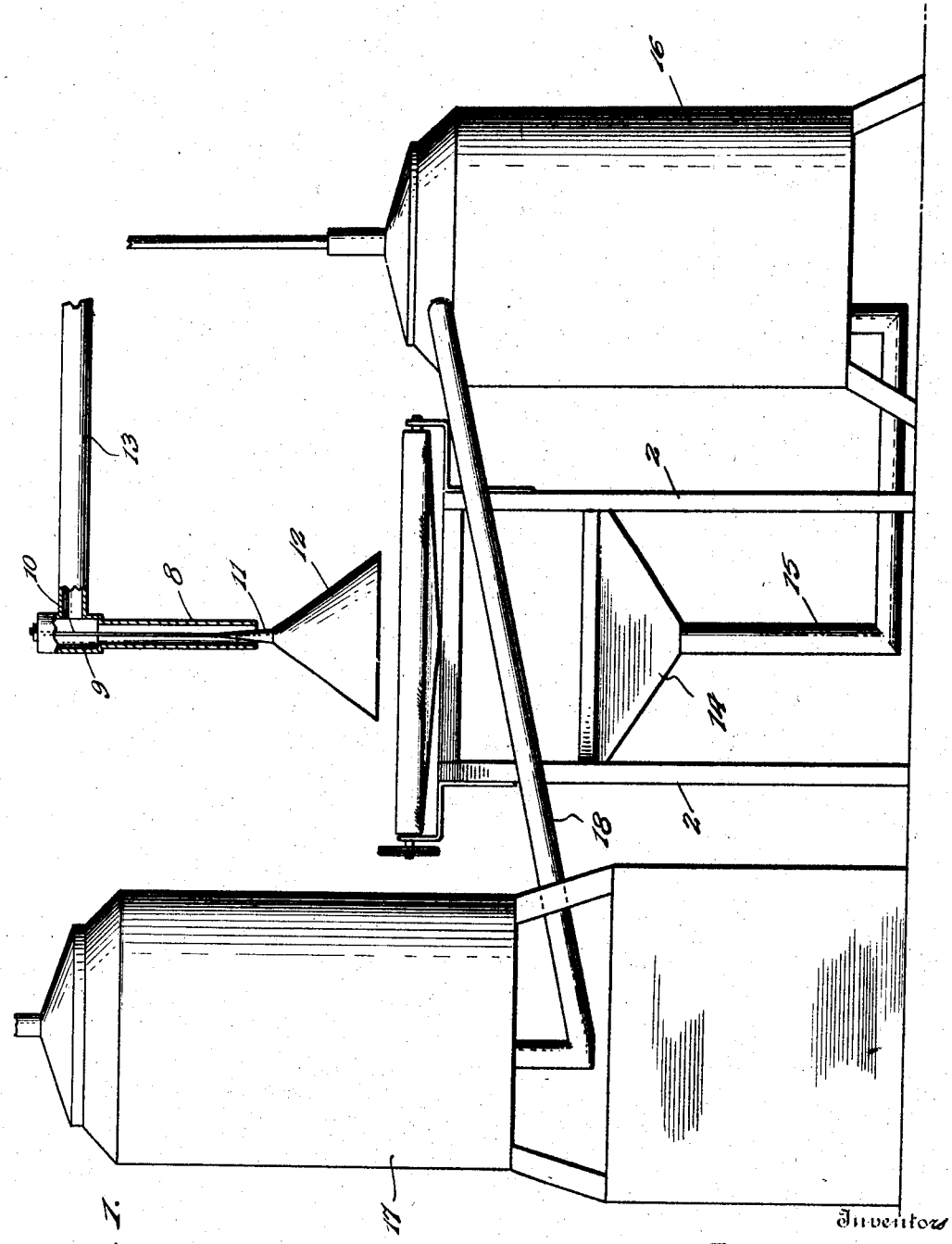

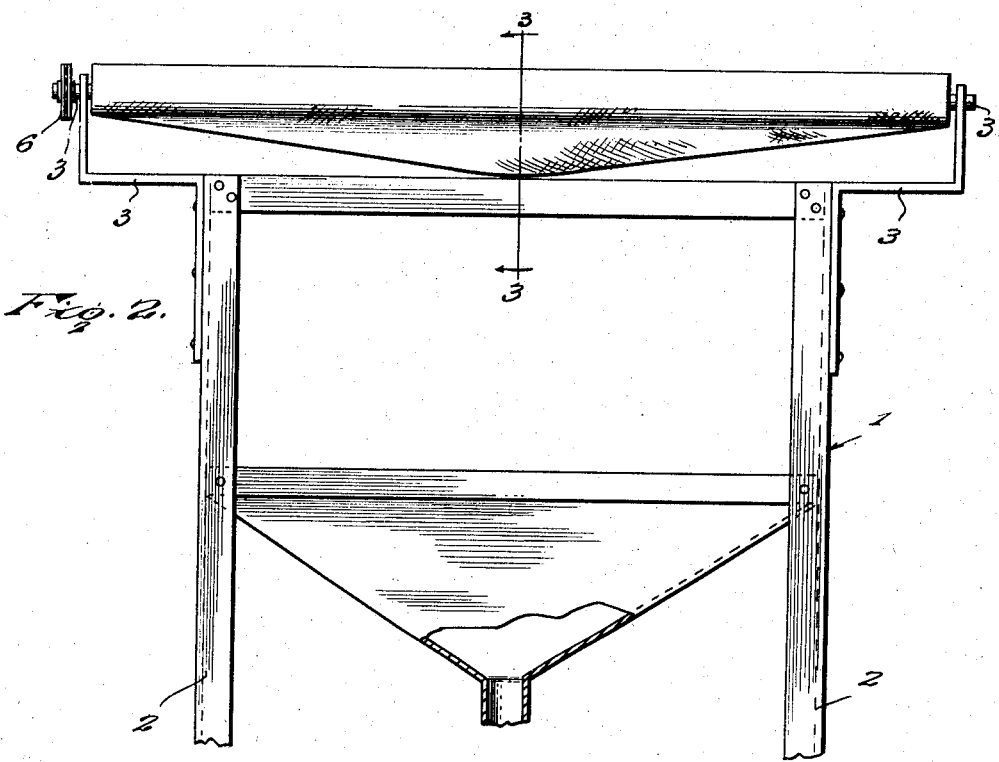
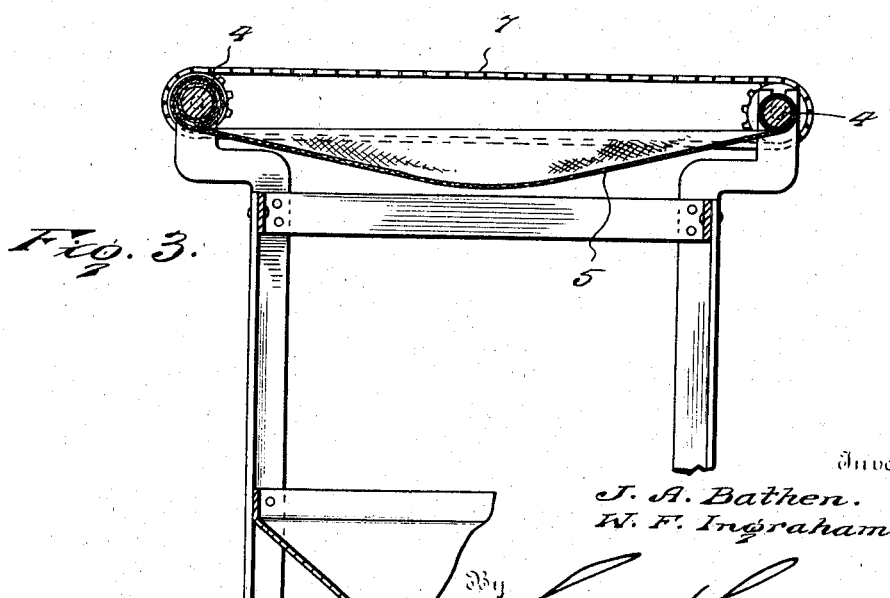

1,813,136

UNITED STATES PATENT OFFICE

JOHN A. BATHEN AND WILLIAM F. INGRAHAM, JR., OF SIOUX CITY, IOWA, ASSIGNORS OF ONE-THIRD TO ABRAHAM D. BLAND, OF SIOUX CITY, IOWA

STRAINER

Application filed June 7, 1928. Serial No. 283,559.

The present invention is directed to improvements in strainers.

The primary object of the invention is to provide a strainer designed more particularly for use in connection with pasteurizing apparatus, but of course is not limited to such use.

Another object of the invention is to provide a device of this character so constructed that the screen material can be rolled after a period of use in order that an unused portion of the material will be positioned for straining the liquid.

Another object of the invention is to provide a device of this character wherein the straining material is mounted upon a pair of rolls, means being provided whereby the material can be rolled from one roll to the other in order that clean or unused parts of the material can be positioned for straining the fluid.

Another object of the invention is to provide means whereby the cream to be strained will be spread so that it will be evenly distributed upon the straining material.

With these and other objects in view, this invention resides in the novel features of construction, formation, combination and arrangement of parts to be hereinafter more fully described, claimed and illustrated in the accompanying drawings, in which:—

Figure 1 is an end view of the device, showing its association with the pastuerizing tanks.

Figure 2 is an enlarged end view of the strainer supporting frame.

Figure 3 is a sectional view on line 3—3 of Figure 2.

Referring to the drawings 1 designates a support which consists of corner posts 2, each post having fixed to its upper end a bracket 3, and said brackets being disposed in pairs upon the ends of the supports. Journaled in the brackets are the trunnions 3 of the rollers 4 and wound upon said rollers is a sheet of cheese cloth, or other suitable fabric 5 which constitutes the straining element of the device.

Certain of the trunnions 3 are provided with sprocket wheels 6 and trained around said wheels an endless sprocket chain 7, it being obvious that upon moving the chain 7 that the rollers will be rotated in order to wind the strainer from one roller to the other in order that a clean or unused part of the strainer will be presented during the straining operation.

Suitably supported above the frame 1 is a vertically disposed discharge tube 8, the upper end of which is connected with a union 9, said union having supported thereby a rod 10, said rod being disposed axially within the tube 8 and is secured to the shank 11 of the conical spreader 12. Leading to the union 9 is a pipe 13 in order that the cream will be conducted to the tube 8 and will be spread by the spreader 12 and it leaves said tube to gravitate to the strainer. In this manner a proper distribution and spreading of the cream is assured.

Supported by the posts 2 and immediately under the strainer 5 is a hopper 14 it being obvious that the strained fluid will gravitate into the hopper and flow therefrom through the pipe assembly 15 to one of the pasteurizing tanks 16, said tank being connected with the other tank 17 by a pipe assembly 18, as is customary.

Owing to the presence of the chain 7 the rollers can be rotated in order that the straining material can be rolled from one to the other in order that a clean portion of the material can be brought under the spreader 12 when desired, and without stopping the straining operation.

It will be of course understood that if desired one of the rollers may be driven by a motor in order that the straining cloth can be wound very slowly from one roller to the other so as to constantly present a clean straining surface.

From the foregoing, it is thought that the construction, operation and many advantages of the herein described invention will be apparent to those skilled in the art, without further description, and it will be understood that various changes in the size, shape, and proportion and minor details of construction, may be resorted to without departing from the spirit or sacrificing any of the advantages of the invention.

We have illustrated the strainer used in connection with the pasteurizing tanks, but it will be of course understood that a strainer constructed in accordance with our invention can be used with equal success for straining fluids other than cream.

What is claimed is:—

A device of the class described comprising a support, a pair of rollers revolubly mounted upon the support, sprocket wheels connected with the rollers, an endless sprocket chain trained around the sprocket wheels for simultaneously rotating the rollers, a sheet of screening material windable upon actuation of the chain from one roller to the other in a plane below the longitudinal axes of the rollers, and means for discharging liquid upon the sheet, one stretch of the chain serving to prevent rotation of the rollers when the sheet is subjected to the weight of fluid, whereby abnormal sagging of the sheet is prevented.

In testimony whereof we affix our signatures.

JOHN A. BATHEN. [L. S.]
WILLIAM F. INGRAHAM, Jr. [L. S.]